United States Patent
Dong

(10) Patent No.: US 9,325,926 B2
(45) Date of Patent: Apr. 26, 2016

(54) TERMINAL AND METHOD FOR CONTROLLING BACKGROUND PROJECTION

(71) Applicant: ZTE CORPORATION, Shenzhen (CN)

(72) Inventor: Pu Dong, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/369,808

(22) PCT Filed: May 7, 2014

(86) PCT No.: PCT/CN2014/076932
§ 371 (c)(1),
(2) Date: Oct. 17, 2014

(87) PCT Pub. No.: WO2014/183580
PCT Pub. Date: Nov. 20, 2014

(65) Prior Publication Data
US 2015/0249802 A1 Sep. 3, 2015

(30) Foreign Application Priority Data
Nov. 11, 2013 (CN) .......................... 2013 1 0556819

(51) Int. Cl.
| H04N 17/00 | (2006.01) |
| H04N 17/02 | (2006.01) |
| H04N 5/44 | (2011.01) |
| G09G 5/14 | (2006.01) |
| G06F 3/14 | (2006.01) |
| G06T 1/20 | (2006.01) |
| G09G 5/00 | (2006.01) |
| H04N 5/74 | (2006.01) |
| H04N 9/31 | (2006.01) |
| G09G 3/00 | (2006.01) |

(52) U.S. Cl.
CPC ................ *H04N 5/44* (2013.01); *G06F 3/1438* (2013.01); *G06T 1/20* (2013.01); *G09G 5/003* (2013.01); *G09G 5/14* (2013.01); *H04N 5/74* (2013.01); *H04N 9/3173* (2013.01); *G09G 3/001* (2013.01); *G09G 2360/06* (2013.01)

(58) Field of Classification Search
CPC .............. H04N 5/44; H04N 5/74; G06T 1/20; G09G 5/003
USPC .................. 348/184, 553, 559–562, 766–785
See application file for complete search history.

(56) References Cited

U.S. PATENT DOCUMENTS

2012/0194487 A1  8/2012  Roethig et al.
2012/0320081 A1* 12/2012  Kim et al. ..................... 345/619

(Continued)

FOREIGN PATENT DOCUMENTS

| CN | 102314287 | 1/2012 |
| CN | 102637119 | 8/2012 |

(Continued)

*Primary Examiner* — Trang U Tran
(74) *Attorney, Agent, or Firm* — Pearl Cohen Zedek Latzer Baratz LLP

(57) ABSTRACT

A terminal and a method for controlling background projection are provided. The terminal at least includes: an intelligent operation module, configured to receive a background projection instruction from a user and process a first process configured to read a projection video signal and a second process configured to read a display video signal at the same time; and transmit the read projection video signal and display video signal to a video processing module; wherein, the first process runs in the background, and the second process runs in the foreground; and a video processing module, configured to process the received projection video signal and display video signal respectively, and transmit the processed projection video signal to a projection module for projection and transmit the processed display video signal to a display module for display.

6 Claims, 3 Drawing Sheets

(56) References Cited

U.S. PATENT DOCUMENTS

| | | |
|---|---|---|
| 2013/0176237 A1 | 7/2013 | Chu |
| 2013/0278484 A1 | 10/2013 | Hwang et al. |
| 2013/0279877 A1* | 10/2013 | Boak .............................. 386/231 |
| 2014/0013331 A1* | 1/2014 | Noro .............................. 718/103 |

FOREIGN PATENT DOCUMENTS

| | | |
|---|---|---|
| CN | 103297650 | 9/2013 |
| CN | 103365620 | 10/2013 |
| WO | WO 2009/038902 | 3/2009 |

* cited by examiner

TERMINAL AND METHOD FOR CONTROLLING BACKGROUND PROJECTION

CROSS-REFERENCE TO RELATED APPLICATIONS

This application is a National Phase Application of PCT International Application No. PCT/CN2014/076932, entitled "TERMINAL AND METHOD FOR CONTROLLING BACKGROUND PROJECTION", International Filing Date May 7, 2014, which in turn claims priority from Chinese Patent Application No. 201310556819.1, filed Nov. 11, 2013, all of which are incorporated herein by reference in their entirety.

TECHNICAL FIELD

The present invention relates to the field of intelligent miniature terminals, and in particular, to a terminal and a method for controlling background projection.

BACKGROUND OF THE RELATED ART

At present, the applications of projectors have gained popularity, which not only become people's right hand in office and meetings, but also usually appear in the family and daily life. Traditional projectors have superior performance and high degree of specialization, but have a large volume, is not suitable to carry, and is complex to connect, and due to the limitation by use conditions, becomes increasingly difficult to meet the current high efficient and fast office mode. Therefore, integrated, intelligent and portable miniature terminals gradually enter people's sight.

Such miniature intelligent terminal is generally carried with an intelligent processor and an intelligent operating system, is provided with a touch screen, integrates mobile hotspot functions with protection functions, is connected to an external device in a wireless mode or a wired mode, and itself also can access the internet in a wireless mode. The primary application scenarios of the intelligent terminal are as follows: (1) an external device (such as a smart phone or a tablet computer) may access the terminal in a wireless or wired mode, to project the contents displayed by the external device; (2) the intelligent terminal may be operated through a touch display of the intelligent terminal to access the internet, to play and project the contents to be displayed online, or download the contents locally for play and projection.

At present, the projection can be combined with the mobile phone, i.e., the contents displayed by the screen of the mobile phone are projected and played at the same time. Then, if a user wants to perform other task operations, the user must terminate the projection to perform the operations, which is inconvenient to use. For example, when the user also wants to view a certain document while projecting and playing the video of the mobile phone, the user must stop the projection for view, and if the document is intended not to be viewed by others, it is more inconvenient to operate.

SUMMARY OF THE INVENTION

The purpose of the embodiments of the present invention is to provide a terminal and a method for controlling background projection, which can implement a background projection function.

In order to achieve the above purpose, the embodiments of the present invention provide a terminal, at least comprising:

an intelligent operation module, configured to receive a background projection instruction from a user, process a first process configured to read a projection video signal and a second process configured to read a display video signal at the same time; and transmit the read projection video signal and display video signal to a video processing module;

wherein, the first process runs in the background, and the second process runs in the foreground;

a video processing module, configured to process the received projection video signal and display video signal respectively, and transmit the processed projection video signal to a projection module and transmit the processed display video signal to a display module;

the projection module, configured to project the received projection video signal; and the display module, configured to display the received display video signal.

Preferably, the terminal further comprises:

a connection module, configured to receive a projection video signal transmitted by an external device, and transmit the received projection video signal to the intelligent operation module.

Preferably, the connection module is a wired connection module or a wireless connection module.

The embodiments of the present invention further provide a method for controlling background projection, comprising:

detecting a background projection instruction from a user, and processing a first process configured to read a projection video signal and a second process configured to read a display video signal at the same time;

wherein, the first process runs in the background, and the second process runs in the foreground;

after processing the read projection video signal and display video signal respectively, projecting the processed projection video signal and displaying the processed display video signal.

Preferably, the method further comprises:

receiving a projection video signal from an external device; and the first process reading the received projection video signal.

Preferably, said receiving a projection video signal from an external device comprises receiving in a wired mode or a wireless mode.

The embodiments of the present invention implement background projection by a method of using an intelligent operation module to process a first process configured to read a projection video signal and a second process configured to read a display video signal at the same time. When a user needs to perform other operations while performing projection, it only needs to set the projection to run in the background, without enabling the projection to exit and then performing other operations, which is easy to use.

BRIEF DESCRIPTION OF DRAWINGS

The accompanying drawings in the embodiments of the present invention will be described below. The accompanying drawings in the embodiments are used to provide a better understanding of the embodiments of the present invention and explain the embodiments of the present invention together with the description without limiting the protection scope of the embodiments of the present invention.

PREFERRED EMBODIMENTS OF THE PRESENT INVENTION

The embodiments of the present invention will be further described below in conjunction with accompanying drawings, and are not intended to limit the protection scope of the present invention.

Figure 1:
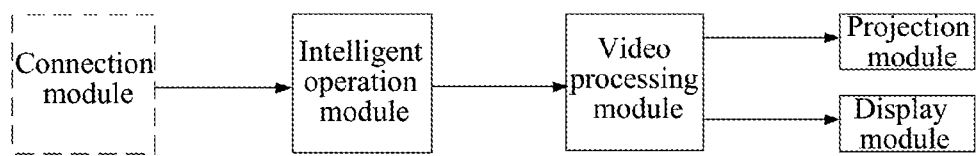
FIG. 1 is a structural constitutional diagram of a terminal according to an embodiment of the present invention.

With reference to FIG. 1, in order to implement the background projection function, the embodiments of the present invention provide a terminal, which at least comprises:

an intelligent operation module, configured to receive a background projection instruction from a user, process a first process configured to read a projection video signal and a second process configured to read a display video signal at the same time; and transmit the read projection video signal and display video signal to a video output module;

wherein, the first process runs in the background, and the second process runs in the foreground;

How to process the processes PA and PB at the same time by the intelligent operation module belongs to the related techniques.

a video processing module, configured to process the received projection video signal and display video signal respectively, and transmit the processed projection video signal to a projection module and transmit the processed display video signal to a display module;

which processes the video processing module performs on the received projection video signal and display video signal and how to perform such processes are well known by those skilled in the art;

the projection module, configured to project the received projection video signal; and the display module, configured to display the received display video signal. The display module may be a touchable display screen, or an untouchable display screen, which is not limited by the embodiments of the present invention.

In the above terminal, if a user does not need projection and play, the intelligent operation module is only configured to:

process the second process, and transmit the display video signal to the video processing module; and the video processing module is only configured to process the received display video signal and transmit the processed display video signal to the display module.

At this time, the projection module is not started to operate.

In the above terminal, if a user wants to use the display contents of the whole screen as projection contents, the intelligent operation module is similarly only configured to:

process the second process, and transmit the display video signal to the video processing module; and the video processing module is also configured to process the received display video signal and transmit the processed display video signal to the display module and the projection module.

A user may select a certain application in the terminal as projection contents, and then the projection video signal is a video signal of the application. An external device (such as a smart phone, a tablet computer, a personal computer PC, an intelligent digital camera etc.) further may transmit the projection video signal on the external device to the intelligent operation module through a connection module; and after the intelligent operation module receives the projection video signal, the first process reads the projection video signal.

The connection module may be a wired connection module or a wireless connection module.

The wired connection module is connected to the external device and the terminal having a background projection function in a wired mode. The wired mode comprises but is not limited to USB, HDMI, MHL etc. The wireless connection module is connected to the external device and the terminal having a background projection function in a wireless mode. The wireless mode comprises but is not limited to WIFI, DLNA, 3G and LTE.

Figure 2:
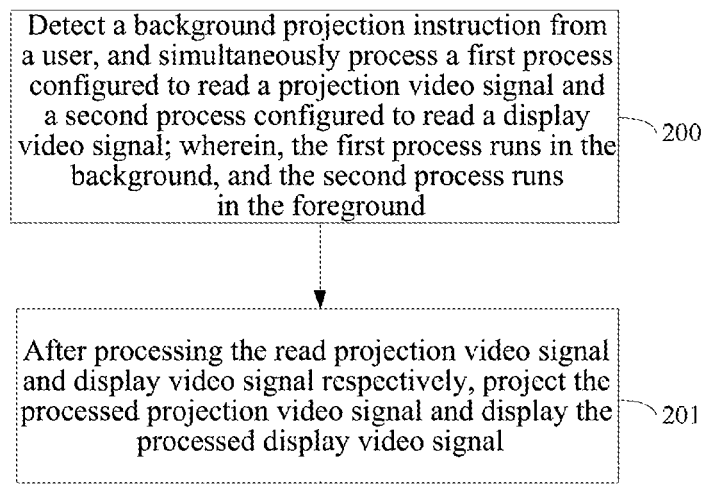
FIG. 2 is a flowchart of a method for controlling background projection according to an embodiment of the present invention.
Figure 3:
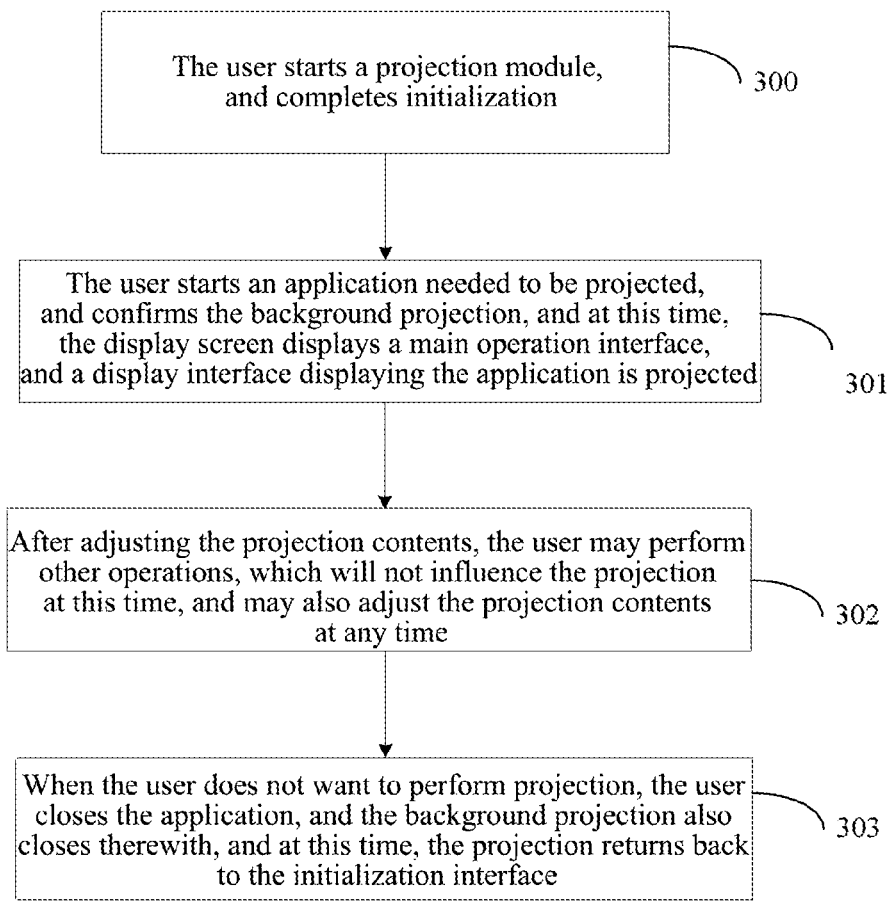
FIG. 3 is a flowchart of a method for controlling background projection according to embodiment one of the present invention.
Figure 4:
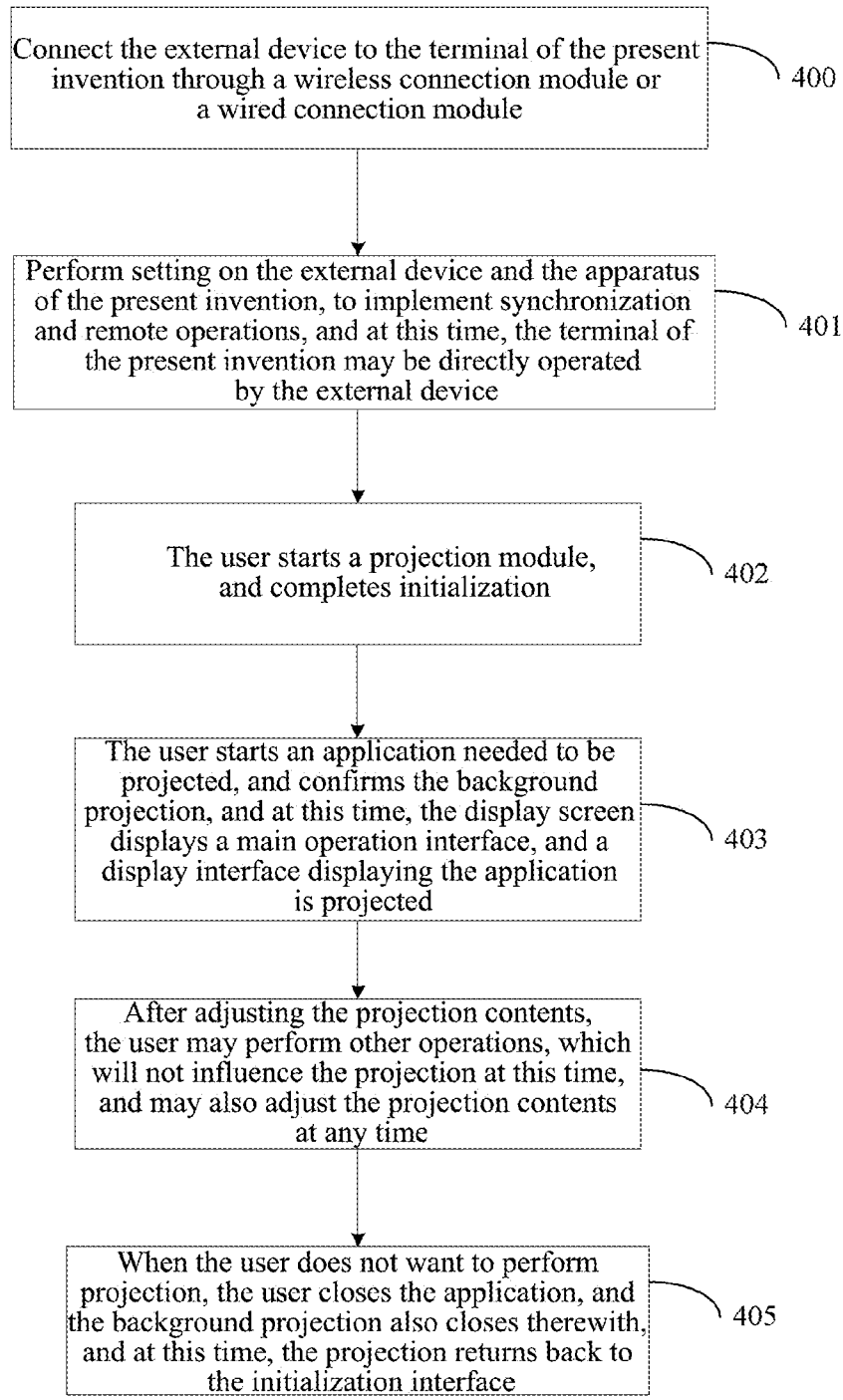
FIG. 4 is a flowchart of a method for controlling background projection according to embodiment two of the present invention.

With reference to FIG. 2, the embodiments of the present invention further provide a method for controlling background projection, comprising:

In step 200, a background projection instruction from a user is detected, and a first process configured to read a projection video signal and a second process configured to read a display video signal are processed at the same time; wherein, the first process runs in the background, and the second process runs in the foreground;

In this step, the projection video signal may be from the terminal of the embodiments of the present invention, or may also be transmitted by an external device to the terminal of the embodiments of the present invention in a wired or wireless connection mode for projection.

In step 201, after processing the read projection video signal and display video signal respectively, the processed projection video signal is projected and the processed display video signal is displayed.

In the above method, when a user does not need to project, only the second process is processed, and the read display video signal is transmitted to the video processing module;

After the display video signal is processed, the processed display video signal is displayed and projected.

In the above method, when a user wants to use the display contents of the whole screen as projection contents, only the second process is processed;

After processing the read display video signal, the processed display video signal is displayed.

Embodiment One

A user directly projecting the application in the terminal of the present invention in the background comprises the following steps:

In step 300, the user starts a projection module, and completes initialization;

in step 301, the user starts an application needed to be projected, and confirms the background projection, and at this time, the display screen displays a main operation interface, and a display interface displaying the application is projected;

In step 302, after adjusting the projection contents, the user may perform other operations, which will not influence the projection at this time, and may also adjust the projection contents at any time;

in step 303, when the user does not want to perform projection, the user closes the application, and the background projection also closes therewith, and at this time, the projection returns back to the initialization interface.

Embodiment Two

Projecting the application in the external device in the background comprises the following steps:

In step 400, the external device is connected to the terminal of the embodiments of the present invention through a wireless connection module or a wired connection module;

in step 401, setting is performed on the external device and the terminal of the embodiments of the present invention, to implement synchronization and remote operations, and at this time, the terminal of the embodiments of the present invention may be directly operated by the external device;

The steps 402~405 are the same as the steps 300~303, except that the operations are implemented by the user on the connected external device.

The embodiments of the present invention implement background projection by a method of using an intelligent operation module to process a first process configured to read a projection video signal and a second process configured to read a display video signal at the same time. When a user needs to perform other operations while performing projection, it only needs to set the projection to run in the background, without enabling the projection to exit and then performing other operations, which is easy to use.

The above embodiments are only used to facilitate understanding by those skilled in the art, and are not intended to limit the protection scope of the embodiments of the present invention. Without departing from the inventive concept of the embodiments of the present invention, any obvious substitution and improvement etc. which are made by those skilled in the art to the embodiments of the present invention belong to the protection scope of the embodiments of the present invention.

INDUSTRIAL APPLICABILITY

The embodiments of the present invention implement background projection by a method of using an intelligent operation module to process a first process configured to read a projection video signal and a second process configured to read a display video signal at the same time. When a user needs to perform other operations while performing projection, it only needs to set the projection to run in the background, without enabling the projection to exit and then performing other operations, which is easy to use.

What is claimed is:

1. A terminal, at least comprising:
an intelligent operation module, configured to receive a background projection instruction from a user, simultaneously process a first process configured to read a projection video signal and a second process configured to read a display video signal; and transmit the read projection video signal and display video signal to a video processing module;
wherein, the first process configured to read the projection video signal runs in the background, and the second process configured to read the display video signal runs in the foreground;
a video processing module, configured to process the received projection video signal and display video signal respectively, and transmit the processed projection video signal to a projection module and transmit the processed display video signal to a display module;
the projection module, configured to project the received projection video signal; and
the display module, configured to display the received display video signal.

2. The terminal according to claim 1, wherein, the terminal further comprises:
a connection module, configured to receive a projection video signal transmitted by an external device, and transmit the received projection video signal to the intelligent operation module.

3. The terminal according to claim 2, wherein, the connection module is a wired connection module or a wireless connection module.

4. A method for controlling background projection, comprising:
receiving a background projection instruction from a user, and simultaneously processing a first process configured to read a projection video signal and a second process configured to read a display video signal and transmitting the read projection video signal and display video signal to a video processing module;
wherein, the first process configured to read the projection video signal runs in the background, and the second process configured to read the display video signal runs in the foreground;
after processing the read projection video signal and display video signal respectively, projecting the processed projection video signal and displaying the processed display video signal.

5. The method according to claim 4, wherein, the method further comprises:
receiving a projection video signal from an external device; and
the first process reading the received projection video signal.

6. The method according to claim 5, wherein, said receiving a projection video signal from an external device comprises receiving in a wired mode or a wireless mode.

* * * * *